United States Patent [19]

Andreasson

[11] 4,453,694
[45] Jun. 12, 1984

[54] MACHINE BASE

[75] Inventor: Donald C. Andreasson, Lake Orion, Mich.

[73] Assignee: Detroit Reamer and Tool Company, Troy, Mich.

[21] Appl. No.: 363,902

[22] Filed: Mar. 31, 1982

[51] Int. Cl.³ .......................................... F16M 13/00
[52] U.S. Cl. .................................... 248/559; 248/635; 248/679; 312/237
[58] Field of Search ............... 248/635, 559, DIG. 10, 248/679, 638, 676, 678; 312/237, 250, 255; 52/27, 729, 722; 177/184, 189; 269/310

[56] References Cited

U.S. PATENT DOCUMENTS

| | | | |
|---|---|---|---|
| 501,914 | 7/1893 | Bruner | 248/676 X |
| 2,115,653 | 4/1938 | Snyder | 248/635 |
| 2,144,849 | 1/1939 | Moore | 269/310 X |
| 2,733,029 | 1/1956 | Griffith | 248/676 |
| 2,952,949 | 9/1960 | Maker | 248/676 X |
| 2,978,213 | 4/1961 | Kass | 248/559 |
| 3,566,558 | 3/1971 | Fisher | 52/236.9 X |
| 3,698,329 | 10/1972 | Diamond et al. | 108/42 |

Primary Examiner—J. Franklin Foss
Assistant Examiner—David L. Talbott
Attorney, Agent, or Firm—Barnes, Kisselle, Raisch, Choate, Whittemore & Hulbert

[57] ABSTRACT

A machine tool base for high accuracy machining which has a vertical walled H-shaped frame of reinforced concrete, the side walls being spanned by a heavy steel plate supporting a massive horizontal granite block on one side of the cross-bar of the H to provide a vibration free machine support. On the other side of the cross-bar of the H is a control chamber area isolated by vibration insulation from the granite block. A coolant drain passage is formed around the granite block to drain off coolant used on metal removing machines supported on the block.

2 Claims, 8 Drawing Figures

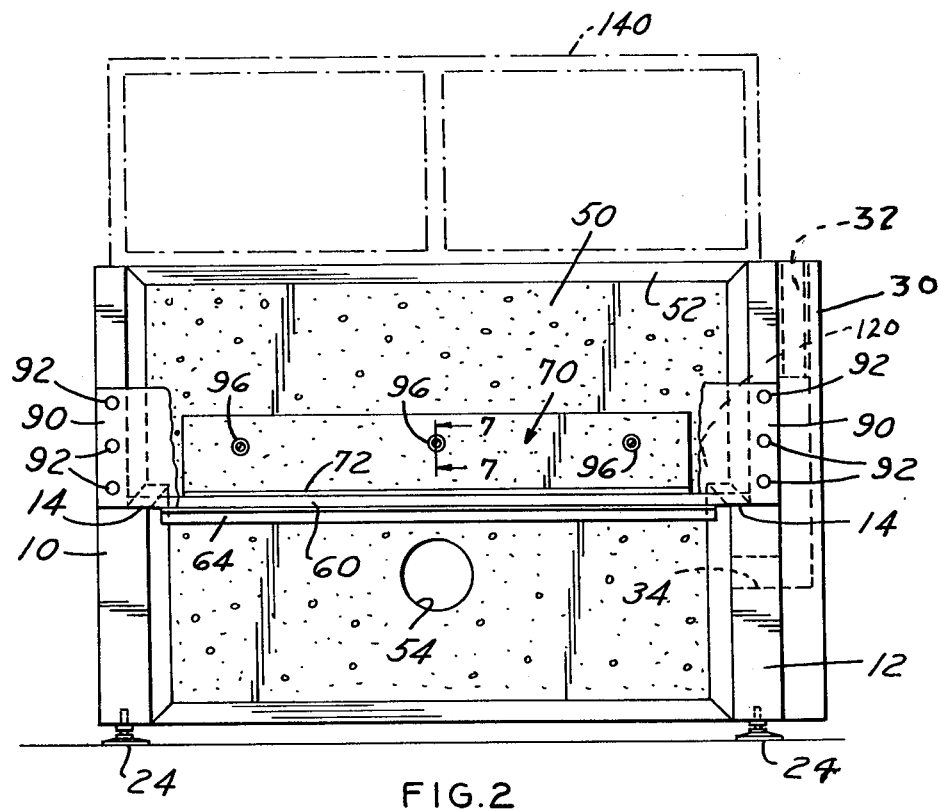

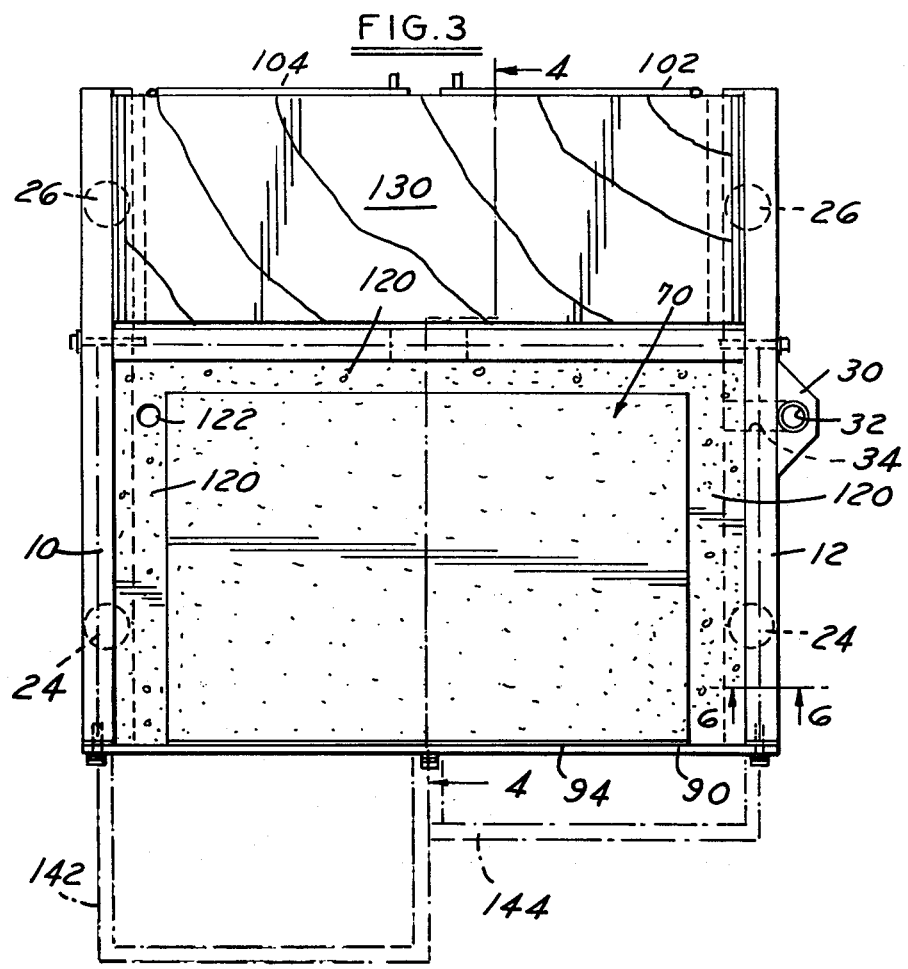

MACHINE BASE

FIELD OF INVENTION

The construction of machine tools where drilling, grinding, and machining operations are performed on workpieces and extreme accuracy is the objective.

BACKGROUND AND THE OBJECTIVES OF THE INVENTION

In performing metal removal operations on workpieces, especially small workpieces such as drills, reamers, hobs, it is an objective to achieve extreme accuracy. This involves control of the metal removing tool as well as the work to avoid vibration and misalignment.

The present invention relates to a machine base which has strength, rigidity and mass to provide as ideal a machine base as is possible for metal removing operations.

Objects and features of the invention will be apparent in the following description and claims in which the invention is set forth together with the manner and process of using it, all in connection with the best mode presently contemplated for the practice of the invention.

BRIEF DESCRIPTION OF THE DRAWINGS

Drawings accompany the disclosure and the various views thereof may be briefly described as:

FIG. 1, a front view of the machine base.
FIG. 2, a back view of the base.
FIG. 3, a top view of the base.
FIG. 6, a section on line 6—6 of FIG. 3.
FIG. 7, a section on line 7—7 of FIG. 1.
FIG. 8, an enlarged view of a connector assembly illustrated also on FIG. 2.

DESCRIPTION OF THE INVENTION AND THE MANNER AND PROCESS OF UTILIZING IT

Figure 4:
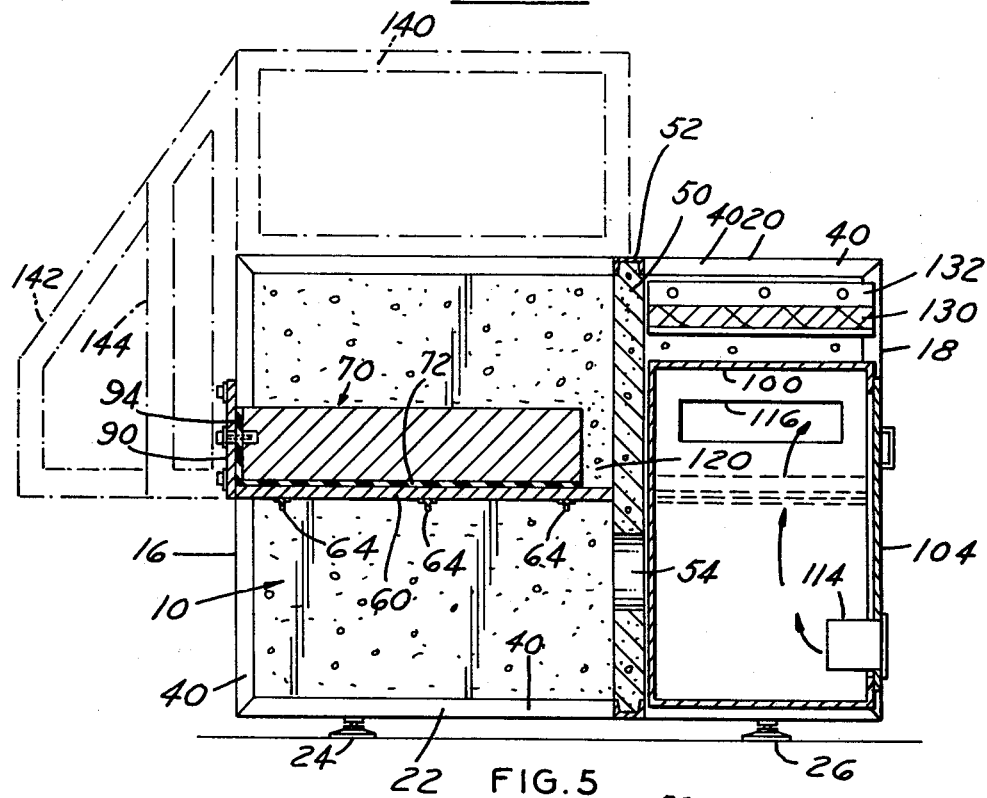
FIG. 4, a side view partially in section.

In FIG. 1, a front view of the assembled machine base is illustrated. Each end 10, 12 is a rectangular wall of cast, steel reinforced concrete and in one example is 5" thick at the bottom section and narrowing at about middle height to 3" in thickness forming a horizontal ledge 14. A side view or elevation of an end 12 is shown in FIG. 4 with a forward edge 16, a rearward edge 18, a top edge 20, and a bottom edge 22. Adjustable vibration isolating support pads 24, 26 are provided on the bottom edge 22.

Figure 5:
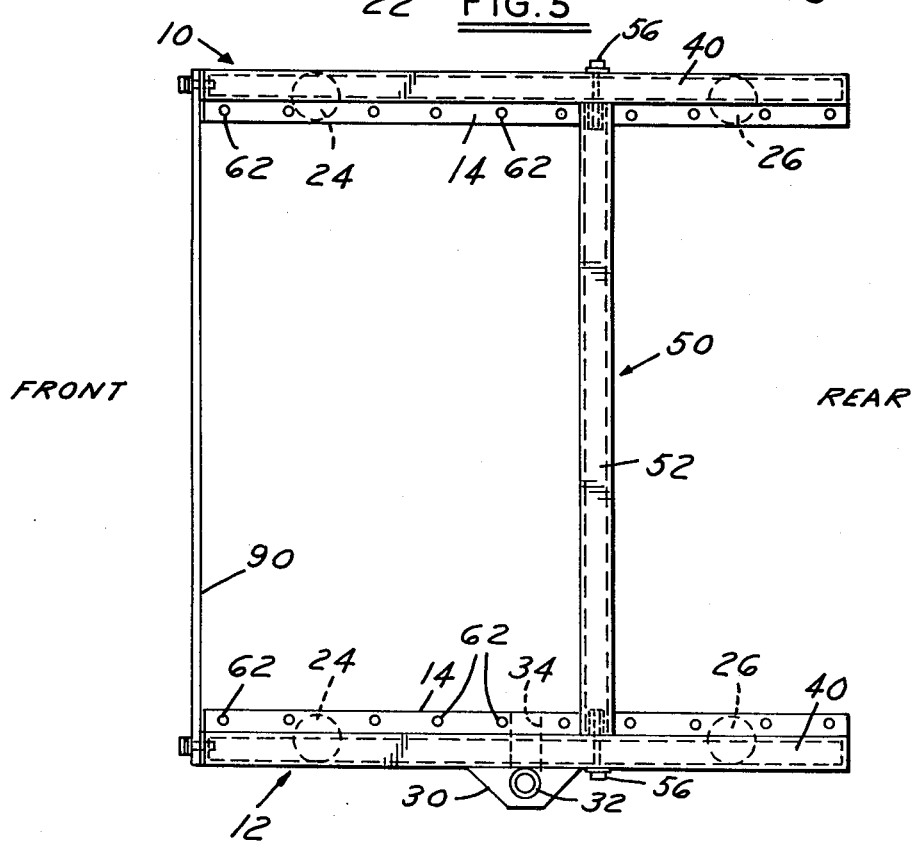
FIG. 5, a top view of the basic base without the work cabinet and the support shelf.

As shown in FIGS. 3 and 5, the right-hand side 12 has a flared out vertical side flute 30 with a longitudinally extending passage 32 vertically disposed in the flute down to a horizontal passage 34. The opening 32 is provided to support a vertical arm of an overhead support for a swinging control cabinet. These passages may also be used for electrical conduits.

The edges of these steel reinforced concrete end panels 10, 12 are preferably capped by steel U-channels 40 to form a perimeter as shown in FIG. 6, which is a section on line 6—6 of FIG. 3. The concrete is cast directly into the U-channels disposed in a suitable form.

The vertical end wall panels 10, 12 are connected by a vertical cross wall panel 50, also of steel reinforced cast concrete within a U-channel frame 52. In one example, this cross panel is about 3" in thickness and it has a narrowed section 53 at the lower part to form a shoulder which rests on the ledge 14 when the parts are assembled (FIG. 2). This cross-panel has a hole 54 for a wiring harness which can pass from suitable control cabinets to the machine components. The cross-panel is cast with suitable anchor nuts which receive bolts 56 to secure the end panels and the cross-panels securely together in a H-shaped unit as viewed from the top. See FIG. 5. The shoulder in the vertical cross-panel 50 rests on the shoulder 14 of the ends 10–12. The mass of the reinforced concrete H-structure is, in the example illustrated, about 3700 pounds.

Between the end panels 10, 12 and in front of the cross-panel 50 is a steel plate 60 (FIGS. 1 and 4), its ends resting on the ledges 14 of the ends. This plate, in an example structure, is 66" wide and 40" deep. It has a thickness of one inch and is ground for accuracy on the top and bottom surface. Four holes are drilled at each end of the steel plate to receive bolts which will anchor the steel plate solidly against the ledge 14. The bolts are screwed into nuts 62 cast into the end plates below the shoulder 14. Three or more T-bars 64 are disposed below the steel plate to support the plate intermediate its sides (FIGS. 1 and 4). Thus, this steel plate further rigidifies the H-structure formed by the ends 10, 12 and the cross-panel 50. The plate weighs about 700 pounds and thus adds considerable mass to the structure.

A granite block 70 supported flat on the steel plate 60 has a length of 55" and a depth of 36" has a thickness of 8". This block is available from the Rock of Ages Corporation, Barre, Vt. The quality is inspection tolerance A(0.00005/ft.). This block is supported on the steel plate 60 with an elastic isolation pad 72 interposed between the steel and the granite. The isolation pad 72 is preferably about ¼" thick and underlies the entire granite block.

Suitable eye-bolt sockets 96 (FIG. 7) are provided around the perimeter of the block to facilitate handling and also to serve a later assembly function. The granite block is provided to support a machining console and workpiece support.

The total mass of the granite block 70 is about 2100 pounds. Thus, the overall mass of the concrete frame, the steel plate and the granite block is about 6400 pounds or 3¼ tons.

A front steel splash plate 90 is positioned above ledge 14 at the front of the unit to overlie the granite block 70. This plate is lodged against the front edge of the block 70 and bolted at 92 to the front edge of the block into threaded inserts or anchors 96 expoxied into the granite as shown in FIG. 7, a sectional view on line 7—7 of FIG. 1. A rubber or elastomeric isolation and sealing strip 94 similar to pad 72 is interposed between plate 90 and granite block 70 and extends also between the steel plate and the U-channel surfaces 40 which surround the end panels 10 and 12. Bolts 92 are suitably anchored at 96 in the granite block but vibration insulation material 98 isolates the bolt and washer from the plate 90 as shown in FIG. 7.

In the space behind the cross-panel 50 and between the end walls 10, 12 suitable enclosures may be mounted for control components. As shown in FIG. 4, a cabinet enclosure 100 with doors 102 and 104 (FIG. 2) is suspended on ledges 14 by angle bars 106, one leg of the bar being mounted on and bolted to ledge 14 (bolts 108) and the other leg being mounted on the cabinet 100 by bolts 110 or other means. Bolts 108 are smaller than the holes in the horizontal flange of bar 106 and isolation material 112 is interposed above and below the flange to isolate the cabinets from the base structure.

The rear walls of enclosure 100 as well as the side walls are spaced from walls 10, 12 and 50 as shown in FIGS. 2 and 4. The doors 102 and 104 have louvered openings 113 behind which are fan housings 114 which draw air in and pass it out side vents 116 in the housing 100.

As will be seen in FIGS. 1 and 4, a U-shaped channel 120 terminating at the front panel 90 provides a coolant trough for liquid coolant being used on a cutting or grinding machine mounted on the granite block. A drain opening 122 will carry coolant back to the tank source.

Thus, the entire machine base is unified and rigid with an exceptional mass to prevent vibration. A tool slide mounted on the granite block may weigh in the neighborhood of 700 to 800 pounds. Various splash plates shown in dot-dash lines may be applied to the base as needed. With the heavy mass base, vibration can practically be eliminated in a machining operation. The base is preferably to be used on automatic computer controlled equipment which can be programmed for production machining, grinding, and inspection.

At the rear of the assembly and above the cabinet 100 a laminated maple shelf 130 is mounted on horizontal angle bars 132 to provide a convenient shelf for service and the like.

Glassed side frames 140 and swinging front cover frames 142 and 144, shown in dotted lines in FIGS. 1 and 4, can be mounted to enclose the operating area of the machine base.

It will be noted that despite the overall mass of the machine base, it is composed of modular components which can be secured together to form what is essentially a monolithic base to form practically a vibration proof machine base assuring ultimate accuracy for the various functions performed on it.

What is claimed is:

1. A machine base for accuracy metal removal as by cutting, grinding and inspection which comprises:
    (a) a massive reinforced concrete frame composed of parallel vertical side walls connected by a vertical cross-wall between the ends of the side walls,
    (b) a massive horizontal steel plate connecting and supported between said side walls on one side of said cross-wall,
    (c) a massive granite slab supported horizontally on said plate spaced from the end and cross-walls for supporting a machining console and workpiece support, and
    (d) a vertical steel plate secured between said end walls against the outer edge of said granite slab to close the space between the ends of said slab and said end walls.

2. A machine base as defined in claim 1 in which a a vibration insulation pad is interposed between said steel plates and said granite slab.

* * * * *